United States Patent [19]

Lordo

[11] Patent Number: 5,562,008
[45] Date of Patent: Oct. 8, 1996

[54] EDGE TRIMMER STARTER PUNCH

[75] Inventor: Richard Lordo, West Middlesex, Pa.

[73] Assignee: Danieli Wean, Youngstown, Ohio

[21] Appl. No.: 406,839

[22] Filed: Mar. 20, 1995

[51] Int. Cl.$^6$ ..................................... B26D 3/14
[52] U.S. Cl. ................. 83/39; 83/425.2; 83/33; 83/74; 83/76.1; 83/367
[58] Field of Search .............. 83/39, 425.2, 425.4, 83/422, 368, 371, 165, 33, 61, 60, 73, 59, 63, 74, 76.1, 367

[56] References Cited

U.S. PATENT DOCUMENTS

| | | | |
|---|---|---|---|
| 2,857,966 | 10/1958 | Sarka | 83/33 |
| 3,069,949 | 12/1962 | Cooley | 83/923 |
| 3,153,962 | 10/1964 | Mercer et al. | 83/33 |
| 3,160,045 | 12/1964 | Newgard | 83/63 |
| 3,185,006 | 5/1965 | Mercer et al. | 83/33 |
| 3,348,440 | 10/1967 | Jensen | 83/63 |
| 3,786,976 | 1/1974 | Murphy, II | 83/61 |
| 3,839,934 | 10/1974 | Russo | 83/63 |
| 4,386,273 | 5/1983 | Jones | 83/74 |
| 4,501,177 | 2/1985 | Logan | 83/165 |
| 4,696,210 | 9/1987 | Cain et al. | 83/33 |
| 4,757,732 | 7/1988 | Arima | 83/425.4 |
| 4,759,249 | 7/1988 | Held | 83/425.4 |
| 5,033,342 | 7/1991 | Nordlof | 83/73 |

FOREIGN PATENT DOCUMENTS 2406506  6/1979  France ......................... 83/59

Primary Examiner—Rinaldi I. Rada
Assistant Examiner—Elizabeth Stanley
Attorney, Agent, or Firm—Nixon, Hargrave, Devans & Doyle

[57] ABSTRACT

An edge trimmer system in accordance with the present invention includes a conveyor system, a cutting assembly, and a pair of starter punches. The cutting assembly includes a pair of side trimmers each with a cutting device which trims one of the elongated edges of a raw strip of steel to produce a parent steel strip and two scrap steel strips. The method includes the steps of stopping the cutting devices from cutting the raw steel strip when only one of the cutting devices is engaged in trimming the raw steel strip; automatically punching first and second starter punch openings through the raw steel strip, each of the first and second starter punch openings being adjacent to one of the elongated edges of the raw steel strip and directly opposite each other, the first starter punch opening extending in a first distance from one of the elongated edges and the second starter punch opening extending in a second distance from the other elongated edge of the raw steel strip; and advancing the first and second starter punch openings in the raw steel strip to the cutting devices to allow the raw steel strip to realign and to re-establish trimming on both sides of raw steel strip in the cutting assembly.

8 Claims, 6 Drawing Sheets

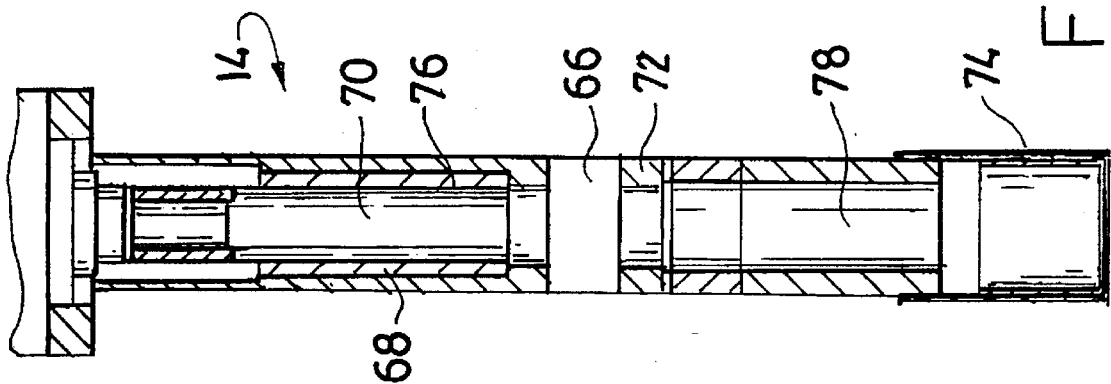
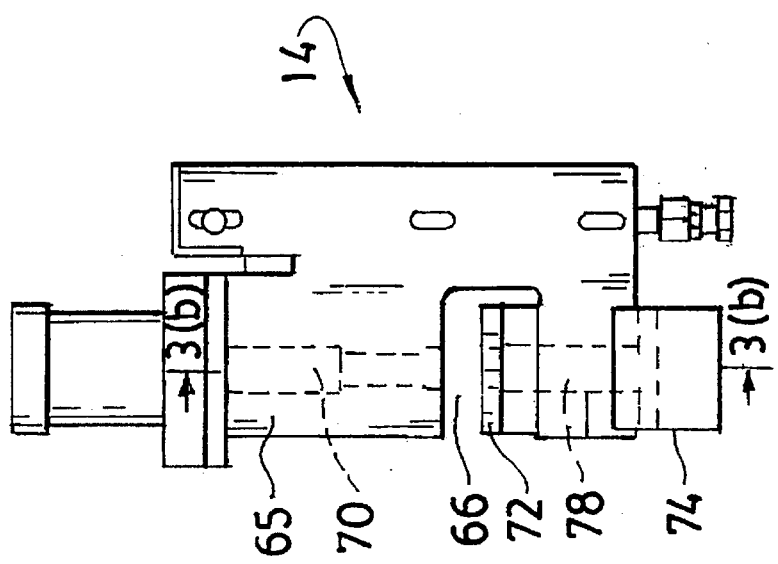

5,562,008

EDGE TRIMMER STARTER PUNCH

FIELD OF THE INVENTION

This invention relates generally to an edge trimming system for trimming opposing elongated edges of a raw strip of steel and, more particularly, relates to a method and apparatus for re-establishing trimming on both sides of the raw steel strip in the edge trimming system when the raw steel strip has drifted from its original alignment in the system.

BACKGROUND OF THE INVENTION

One of the final steps in the manufacturing process of a raw strip of steel involves trimming opposing elongated edges of the raw steel strip to make the edges of the raw steel strip uniform and to make a parent steel strip of a desired width. To trim the opposing elongated edges, the raw steel strip is fed to a cutting mechanism. Typically, the cutting mechanism has a cutting device disposed on each side of the raw steel strip. Each cutting device is positioned inside the opposing elongated edge of the raw steel strip. The cutting devices are adjustable relative to each so that the desired width of raw steel strip can be cut. Once the cutting devices are arranged, the raw steel strip is fed to the cutting mechanism which trims the opposing elongated edges of the raw strip to produce a parent steel strip.

A major problem with the process described above is that the raw steel strip being fed into the cutting mechanism can "drift" away from its original alignment. Eventually, the raw steel strip may become so misaligned that one of the cutting devices is no longer positioned over the raw steel strip and thus is no longer trimming one of the elongated edges.

Prior methods for correcting misalignment of the raw steel strip being trimmed are time consuming and difficult and often result in a substantial amount of raw steel strip being wasted before misalignment is corrected. For example, one method of correcting misalignment and re-establishing cutting on both sides of the raw steel strip involves readjusting the positioning of the cutting devices to a much narrower width than desired for the parent steel strip, resuming feeding of raw steel strip to the cutting devices, and slowly expanding the distance between the cutting devices as the raw steel strip is being trimmed. The main problem with this method is that a sizeable amount of raw steel strip must be trimmed before the cutting devices have returned to their original locations.

Another method of correcting misalignment and re-establishing trimming on both sides of raw steel strip involves stopping the cutting mechanism and feeding of the raw steel strip, cutting by hand a first large notch in the raw steel strip a substantial distance upstream of the cutting mechanism, moving to the other side of the raw steel strip and cutting by hand a second large notch on approximately the opposing side of the first large notch, and then feeding the raw steel strip to each cutting device to allow the raw steel strip to return to its original alignment and to re-establishing trimming on both sides.

However, this method also has several problems. Although less raw steel strip is wasted in this process than in the previously described process, a substantial amount of raw steel strip is still wasted because access to make the cuts for notches in the raw steel strip upstream of the cutting mechanism is limited and is a substantial distance from the cutting mechanism. Additionally, for the process to work the first and second notches have to directly oppose each other. However, achieving this alignment is very difficult because the operator has to "eyeball" the cuts from each side. Accordingly, the first and second notches are made substantially larger than necessary to ensure an overlap portion where first and second large notches directly oppose each other. Unfortunately, the size of the first and second notches is sometimes sufficient to fatigue the raw steel strip and cause a break. Further, the above-described process is extremely time consuming and dangerous to the operator.

SUMMARY OF THE INVENTION

An edge trimmer system in accordance with the present invention includes a conveyor system, a cutting assembly, and a pair of starter punches. The cutting assembly includes a pair of side trimmers each with a cutting device which trims one of the elongated edges of a raw strip of steel to produce a parent steel strip and two scrap steel strips. The method includes the steps of stopping the cutting devices from cutting the raw steel strip when only one of the cutting devices is engaged in trimming the raw steel strip; automatically punching first and second starter punch openings through the raw steel strip, each of the first and second starter punch openings being adjacent to one of the elongated edges of the raw steel strip and directly opposite each other, the first starter punch opening extending in a first distance from one of the elongated edges and the second starter punch opening extending in a second distance from the other elongated edge of the raw steel strip; and advancing the first and second starter punch openings in the raw steel strip to the cutting devices to allow the raw steel strip to realign and to re-establish trimming on both sides of raw steel strip in the cutting assembly.

The edge trimming system with the starter punches in accordance with the present invention provide several advantages. With the starter punches, the raw strip of steel which is being trimmed can be automatically realigned in the cutting assembly to re-establish trimming along both sides with a minimal amount of the raw steel strip being wasted. Since alignment of opposing starter punches can be assured automatically, the starter punch openings can be made much smaller than the prior hand cut notches. With the smaller starter punch openings, the chance of the raw steel strip breaking is minimized. Additionally, the starter punches can be positioned adjacent to the cutting devices and much closer than any hand cut notches could be made in the raw steel strip so much less raw steel strip is wasted. When less raw steel strip is wasted and the chance of breaks in the raw strip steel are reduced, overall profitability in producing parent steel strip is increased. Additionally with the starter punches, realignment of the raw steel strip in the cutting assembly can be accomplished with a minimal amount of effort. Reducing the down time of the edge trimming system increases the amount of parent steel strip which can be produced. Additionally, reducing the amount the operator must spend correcting misalignment free's up the operator's time for other activities and thus increases the operator's productivity. Further, the automatic realignment is much safer for the operator.

BRIEF DESCRIPTION OF THE DRAWINGS

FIG. 3(a) is a side view of a starter punch in accordance with the present invention;

FIG. 3(b) is a cross-sectional view of the starter punch shown in FIG. 3(a) taken along line 3(b)—3(b);

DETAILED DESCRIPTION

Figure 1:
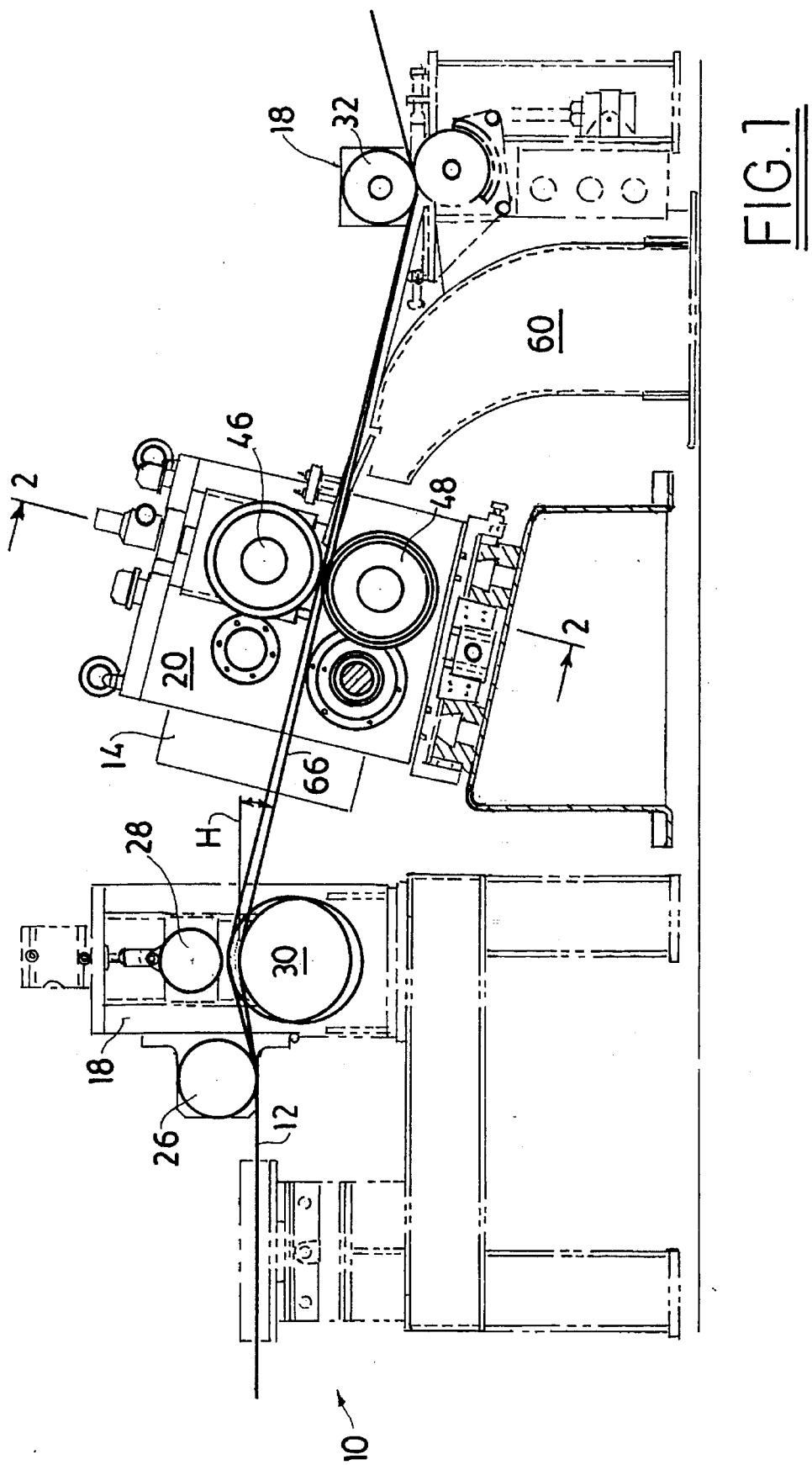
FIG. 1 is a side view of an edge trimming system with a pair of starter punches in accordance with the present invention.

An edge trimming system 10 for a raw strip of steel 12 with a pair of starter punches 14 and 16 in accordance with the present invention is illustrated in FIG. 1. System 10 includes a conveyor system 18, a cutting assembly 20 with the pair of side trimmers 22 and 24, and a pair of starter punches 14 and 16. With starter punches 14 and 16, raw steel strip 12 can be realigned automatically to re-establish trimming on both sides with a minimal amount of raw steel strip 12 being wasted because the starter punches 14 and 16 are automatically aligned directly opposite of each other to make starter punch openings 62 and 64 and are located adjacent to side trimmers 22 and 24. Additionally with starter punches 14 and 16, realignment of raw steel strip 12 to re-establish trimming on both sides of raw steel strip 12 can be accomplished with a minimal amount of effort and with much less danger to the operator.

Referring more specifically to FIG. 1, edge trimming system 10 includes conveyor system 18 which feeds raw steel strip 12 through system 10. Conveyor system 18 has a first set of three rollers 26, 28, and 30 upstream of cutting assembly 20 and a second set of two rollers 32 and 34 downstream of cutting assembly 20. In the first set, roller 26 is disposed before rollers 28 and 30 and on top of raw steel strip 12. Roller 26 guides raw steel strip 12 into rollers 28 and 30. Rollers 28 and 30 are disposed on top of each other and can be adjusted in a vertical direction by a mechanism (not shown). In the second set, rollers 32 and 34 are disposed on top of each other. Rollers 32 and 34 are designed to flatten any burrs which might be found along elongated edges 36 and 38 of parent steel strip 40 and also to feed parent steel strip 40 to the next stage. In this particular embodiment, all of rollers 26–34 are tubular steel rollers with a laminated plastic cover and built-in anti-friction ball bearings, although other types and shapes of rollers could be used. Additionally, edge trimming system 10 could have more than the two sets of rollers 26–34 shown, if desired.

Figure 4A:
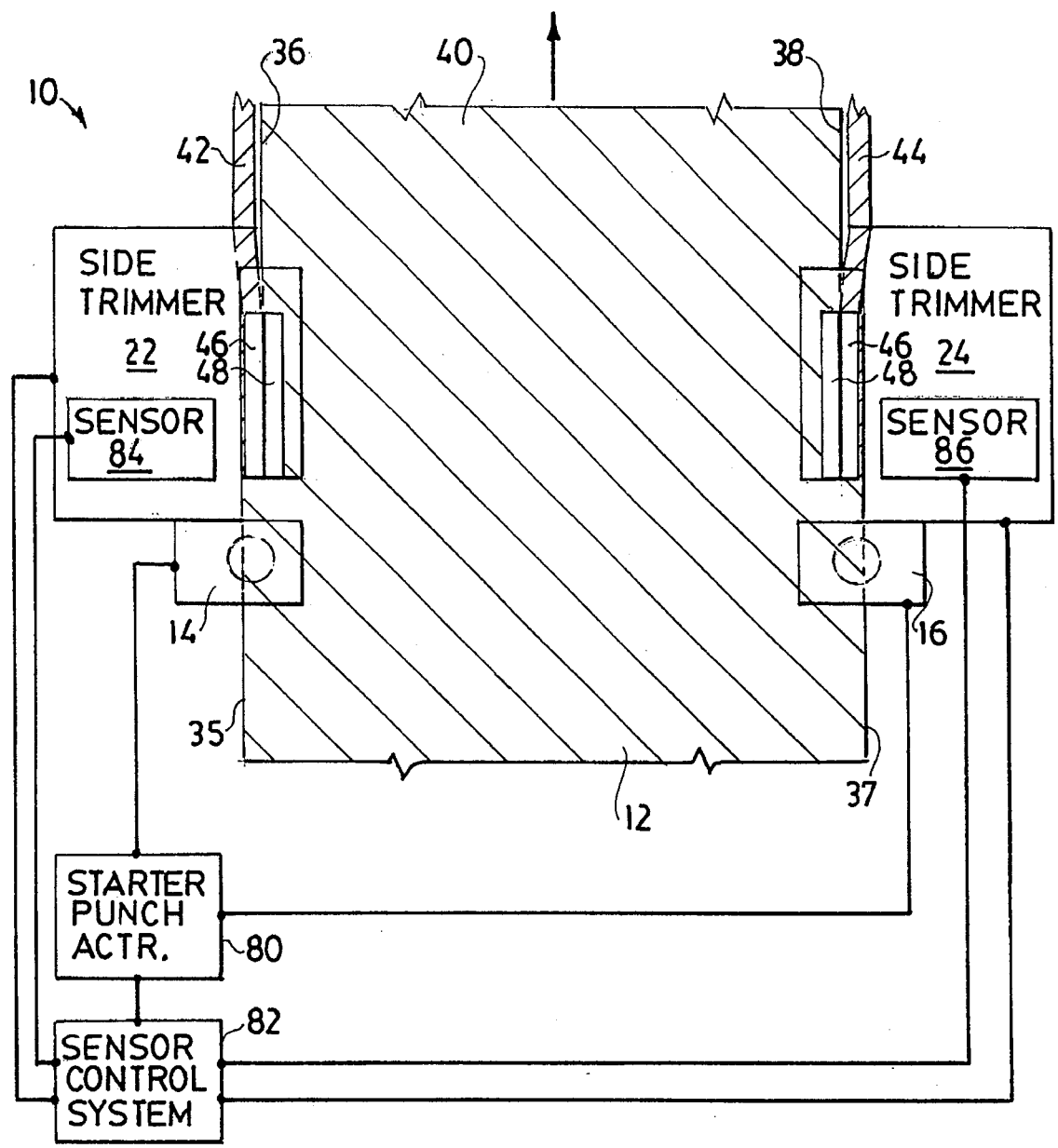
FIG. 4(a) is a top view of the edge trimming system with a properly aligned raw steel strip being trimmed.

Edge trimming system 10 also includes cutting assembly 20 which simultaneously trims opposing elongated edges 36 and 38 of raw steel strip 12 to produce parent steel strip 40 at a desired width and two scrap steel strips 42 and 44, as shown in FIG. 4(a). Referring to FIG. 1, cutting assembly 20 is tipped to provide a cutting angle of about thirteen degrees below horizontal H. Cutting assembly 20 is positioned at an angle to allow side scrap strips 42 and 44 to deflect downwards more easily. Although cutting assembly 20 is tipped at an angle of thirteen degrees, cutting assembly 20 could be positioned at other angles if desired.

Figure 2:
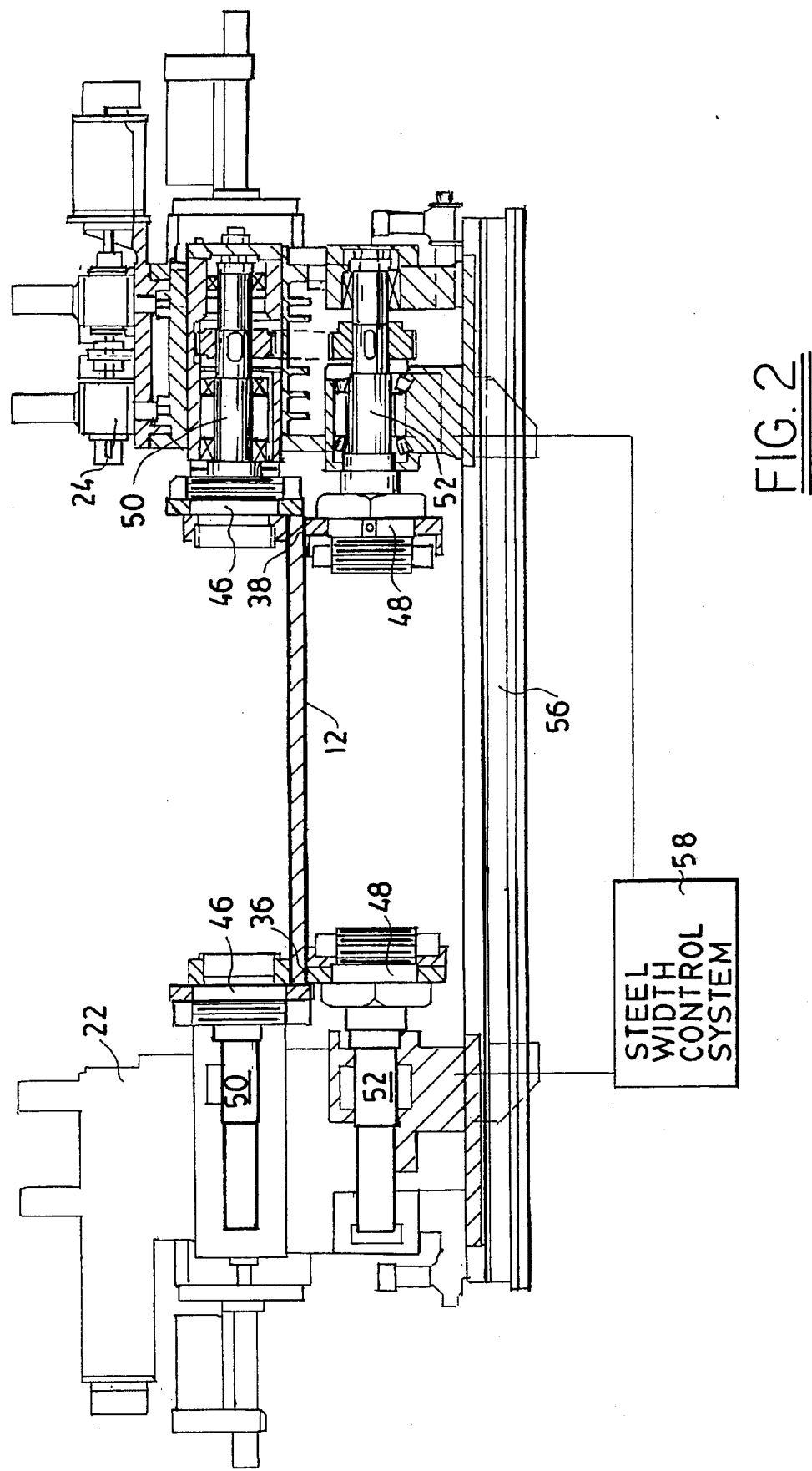
FIG. 2 is a cross-sectional view of the cutting assembly shown in FIG. 1 taken along line 2—2.

Referring to FIG. 2, cutting assembly 20 includes identical side trimmers 22 and 24 which are positioned adjacent opposing elongated edges 35 and 37 of raw steel strip 12. Each side trimmer 22 and 24 has an upper rotary knife 46 and a lower rotary knife 48 which are offset from each other and operate to trim raw steel strip 12. A pair of worm/screw mechanisms (not shown) enable upper rotary knife 46 to be adjusted in both a vertical and a horizontal direction to change cutting overlap and gap of knives 46 and 48. Lower rotary knife 48 is not adjustable. In this particular embodiment, upper and lower rotary knives 46 and 48 are made from alloy steel or carbide and have a diameter of about 12 inches or 304.8 mm and a thickness of about 1.25 inches or 31.75 mm, although the material from which knives 46 and 48 are made and the particular dimensions of knives 46 and 48 can vary as needed and desired.

An upper spindle 50 and a lower spindle 52 are rotatably coupled into the center of upper and lower rotary knives 46 and 48 and to a gear mechanism (not shown). A main drive motor (not shown) controls the speed of knives 46 and 48 relative to the speed at which raw steel strip 12 is fed into cutting assembly 20.

Figure 4B:
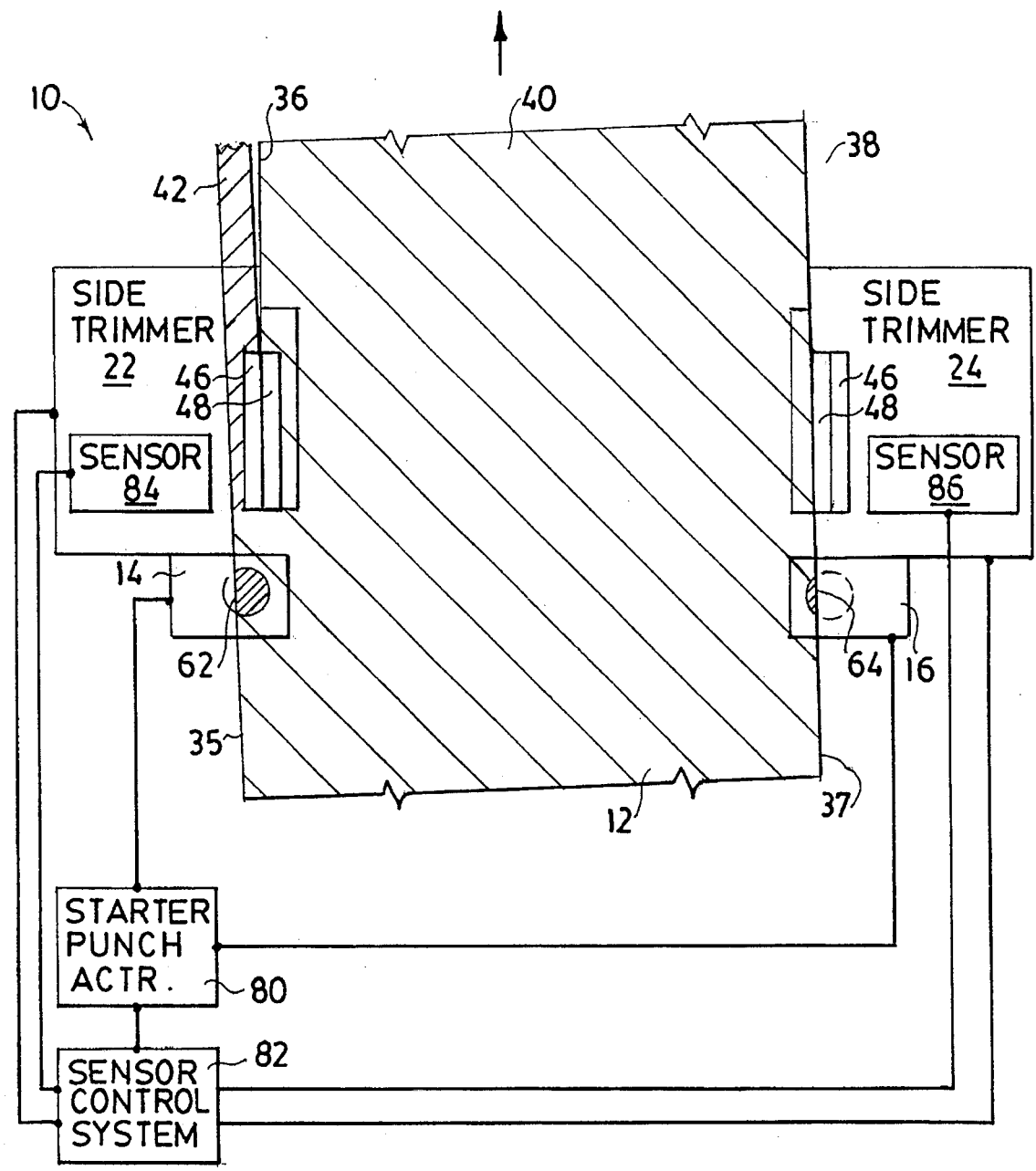
FIG. 4(b) is a top view of the edge trimming system with the raw steel strip misaligned.
Figure 4C:
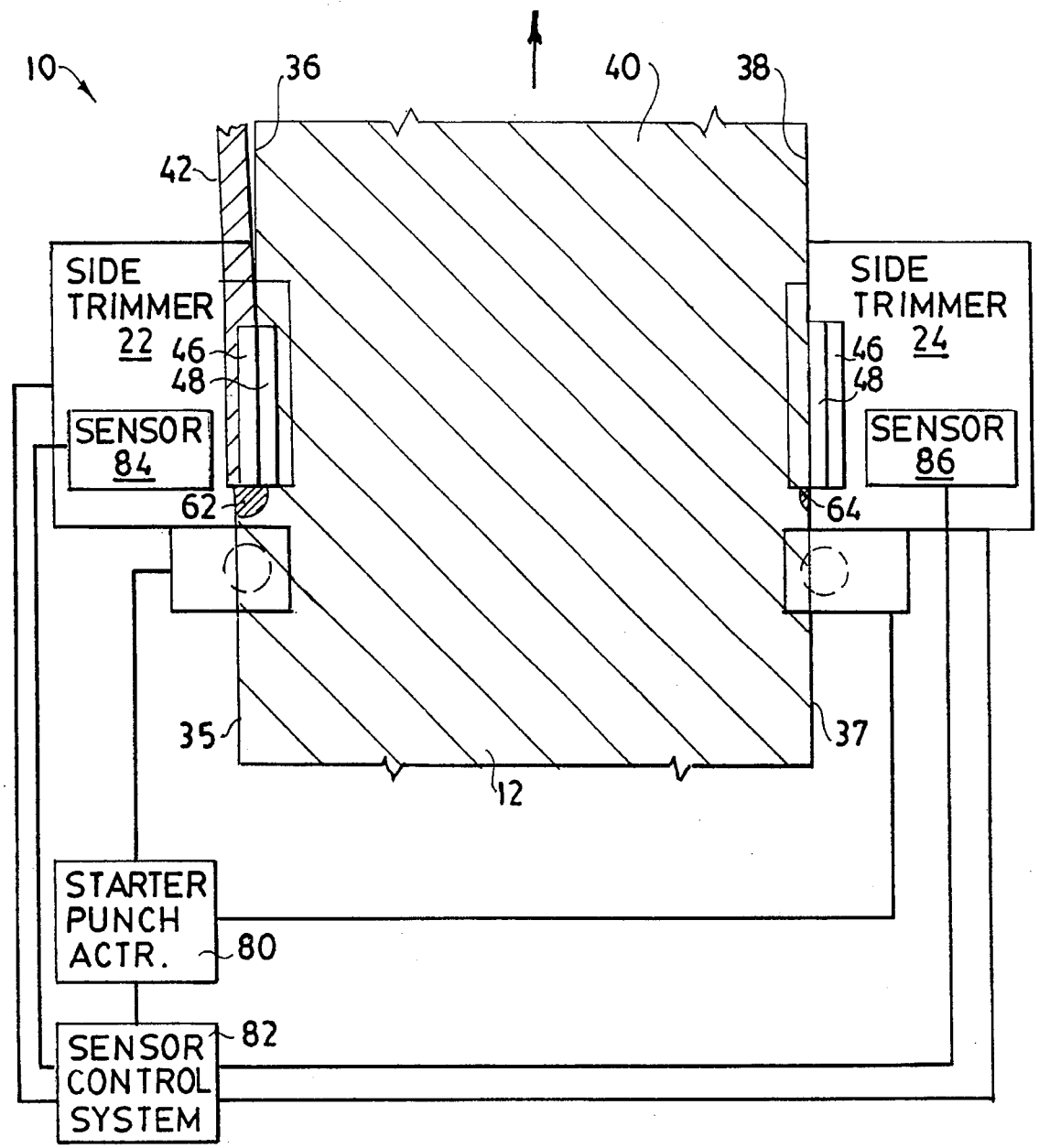
FIG. 4(c) is a top view of the edge trimming system with the starter punch openings positioned at the cutting devices to realign the raw steel strip so trimming on both sides can be re-established.

Each side trimmer 22 and 24 is adjustably mounted on a base 56 which extends substantially perpendicular to the path of travel [shown by the arrow in FIGS. 4(a–c)] for raw steel strip 12. A motor operated screw and nut arrangement (not shown) is coupled to each side trimmer 22 and 24 and to a steel width control system 58. Steel width control system 58 comprises a computer system with a keyboard and display (not shown) and which operates on a set of instructions that enable an operator to engage the motor screw and nut arrangement to make adjustments on the relative positions of each side trimmer 22 and 24 on base 56. An optional hand operated vernier adjuster (not shown) may be coupled to each side trimmer 22 and 24 and can be used to make further adjustments to the position of each side trimmer 22 and 24 on base 56. A locking mechanism (not shown) is found on each side trimmer 22 and 24 and is used to lock side trimmers 22 and 24 in place on base 56 once the desired position is found.

Referring back to FIG. 1, edge trimming system 10 also includes a scrap chute 60 and disposal system (not shown). Scrap chute 60 is positioned downstream of cutting assembly 20 to catch and guide scrap steel strips 42 and 44 down a scrap chute 60 to disposal system where scrap steel strips 42 and 44 can be recycled or discarded.

Referring to FIGS. 1 and 3(a–b), edge trimming system 10 also includes starter punches 14 and 16 which stamp out starter openings 62 and 64 in raw steel strip 12 [see FIGS. 4(b and c)] when activated to allow raw steel strip 12 to realign and to re-establishing trimming on both sides of raw steel strip 12. Starter punches 14 and 16 are upstream, at the entry side, of cutting assembly 20 and are each secured to cutting assembly 20 by bolts or other securing means. As a results each starter punch 14 and 16 is adjacent to rotary knives 46 and 48 in side trimmers 22 and 24. Each starter punch 14 and 16 has a passage 66 [shown in FIGS. 3(a–b)] to permit raw steel strip 12 to pass through and includes a punch unit 68 with a punch 70, a punch plate 72, and a scrap pan 74. Starter punch 16 is identical to starter punch 14 show in FIGS. 3(a–b).

Punch unit 68 defines an elongated passage 76 along which punch 70 can travel. Punch units 68 in system 10 are disposed directly opposite from each other and adjacent cutting assembly 20. In this particular embodiment, each punch unit 68 comprises a 50.8 mm (200 inches) punch 70, although other size punches 70 could be used. In a first position, punch 70 in punch unit 68 is disposed directly above passage 66 as shown in FIG. 3(a). In a second position, punch 70 is driven down elongated passage 76 and through passage 66 and any portion of raw steel strip 12 in passage 66 to punch plate 72. Punch unit 68 includes another passage 78 which extends to scrap pan 74. When punch 70 passes through raw steel strip 12, the portion of raw steel strip 12 stamped out drops down passage 78 to scrap pan 74 which collects the portions of raw steel strip 12 stamped out. In this particular, embodiment, each punch 70 stamps out starter punch opening 62 or 64 which is 2.00 inches in diameter, although the particular dimensions can vary depending upon the size of punch 70 and location of raw steel strip 12 in passage 66. At least one starter punch 62 or 64 opening should extend in from elongated edge 35 or 37 at a distance greater than the width of scrap steel strip 42 or 44 being cut. Starter punch openings 62 and 64 are much smaller than prior hand cut notches which needed to be much larger to provide some common overlap. Since starter punch openings 62 and 64 are smaller, raw steel strip 12 is much less likely to break causing system 10 to shut down and wasting raw steel strip 12.

Referring to FIG. 4(a–c), edge trimming system 10 also includes a starter punch actuator 80 with an operator activated switch (not shown) and a sensor control system 82 with a pair of sensors 84 and 86. Starter punch actuator 80 is coupled to each starter punch 14 and 16 and when activated causes each punch 70 to move between its first and second positions. In this particular embodiment, a hydraulic system is used to implement starter punch actuator 80, although other types of systems could be used if desired. Operator activated switch (not shown) is coupled to starter punch actuator 80 and when turned on activates starter punch actuator 80.

Alternatively, sensor control system 82 with sensors 84 and 86 can be used to automatically activate starter punch actuator 80. One sensor 84 or 86 is disposed adjacent to each set of upper and lower rotary knives 46 and 48 in each side trimmer 22 or 24 and is coupled to sensor control system 82. Each sensor 84 and 86 is designed to sense when raw steel strip 12 is no longer being trimmed by knives 46 and 48 in one side trimmers 22 or 24. Any type of sensor 84 or 86 could be used such as a photoelectric sensor. Sensor control system 82 is also coupled to each side trimmer 22 and 24 and to conveyor system 18. Sensor control system 82 is a computer system which operates on a set of instructions to control when starter punch actuator 80 is activated. When sensor control system 82 receives a signal from one of the sensors 84 or 86 that raw steel strip 12 has drifted and is no longer engaged by knives 46 and 48, sensor control system 82 signals each side trimmer 22 and 24 and conveyor system 18 to stop and then activates starter punch actuator 80.

Referring to FIGS. 1 and 4(a–c), the operation of edge trimming system 10 with starter punches 14 and 16 is illustrated. Initially, side trimmers 22 and 24 must be adjusted on base 56 to the proper location to trim raw steel strip 12 to produce parent steel strip 40 with the proper width. To make the adjustment, operator inputs into steel width control system 58 the desired width or position of side trimmers 22 and 24 and steel width control system 58 engages motor operated screw and nut arrangement to adjust the position of side trimmers 22 and 24 to the proper location. Next, operator checks the location of each side trimmer 22 and 24 and may make any final adjustments on the position of side trimmers 22 and 24 with optional hand operated vernier adjusters on each side trimmer 22 and 24. Once the position of each side trimmer 22 and 24 is set, operator uses locking mechanism to secure side trimmers 22 and 24 in place on base 56.

Once the position of side trimmers 22 and 24 is secured, conveyor system 18 can be engaged and a raw strip of sheet steel 12 can be fed into the first set of rollers 26–30. Rollers 28 and 30 are positioned above roller 26 so that raw steel strip 12 is fed at an upward angle to rollers 28 and 30 and then downward at an angle of thirteen degrees with respect to horizontal into cutting assembly 20. The downward angle at which raw steel strip 12 is fed into cutting assembly 20 should be substantially the same angle that cutting assembly 20 is tipped with respect to horizontal H. The particular angle at which raw steel strip 12 is tipped can vary as needed and desired. The direction of travel of raw steel strip 12 in cutting assembly 20 is shown by the arrow in FIGS. 4(a–c).

In cutting assembly 20, upper and lower rotary knives 46 and 48 in each side trimmer 22 and 24 are driven by a drive motor (not shown) to trim the elongated edges 35 and 37 of raw steel strip 12 to form a parent strip 40 at the desired width, as shown in FIG. 4(a). Typically, upper and lower rotary knives 46 and 48 in each side trimmer 22 and 24 trim off scrap steel strips 42 and 44. Scrap steel strips 42 and 44 trimmed from raw steel strip 12 are guided down scrap chute 60 to scrap disposal system for recycling or to be discarded. Parent strip steel 40 continues to rollers 32 and 34 which flatten any burrs along the edge of parent steel strip 40 and passes parent steel strip 40 to the next stage.

Optional sensors 84 and 86 in each side trimmer 22 and 24 monitor the position of raw steel strip 12 with respect to upper and lower rotary knives 46 and 48 in each side trimmer 22 and 24. If raw steel strip 12 "drifts" so that upper and lower rotary knives 46 and 48 in one side trimmer 22 or 24 are no longer engaged with raw steel strip 12, then one sensor 84 or 86, in this particular example sensor 86 as shown in FIG. 4(b), signals sensor control system 82. Sensor control system 82 would then automatically signal side trimmers 22 and 24 and conveyor system 18 to stop when sensor control system 82 receives a signal from either sensor 84 or 86. Alternatively, an operator can monitor the operation of edge trimming system 10 and can stop side trimmers 22 and 24 and conveyor system 18 when the operator sees that raw steel strip 12 has drifted.

Once side trimmers 22 and 24 and conveyor system 18 have stopped, either sensor control system 82 or the operator signals starter punch actuator 80 to activate starter punches 14 and 16 to stamp out starter punch openings 62 and 64 through raw steel strip 12. Since starter punches 14 and 16 are directly opposite from each other much smaller starter punch openings 62 and 64 can be stamped out than with the prior hand cut notches. As a result, raw steel strip 12 is less likely to fatigue and break because starter punch openings 62 and 64 are small. Additionally, starter punches 14 and 16 are adjacent knives 46 and 48 in side trimmers 22 and 24 so that very little raw steel strip 12 is wasted than in the prior system. Furthermore, realigning and re-establishing the trimming on both sides of raw steel strip 12 can be done more quickly than in prior systems and at a substantially less risk to the operator.

The depth of starter punch opening 62 or 64 along elongated edge 35 or 37 of raw steel strip 12 which is still engaged by knives 46 and 48 of one of the side trimmers 22 or 24 should be greater than the width of scrap steel strip 42 or 44 being trimmed by that side trimmer 22 or 24 so that starter punch opening 62 or 64 is sufficiently large enough to allow raw steel strip 12 to realign and to re-establish trimming on both sides of raw steel strip 12 when it reaches engaged knives 46 and 48 of side trimmer 22 or 24. In this particular example, the depth of starter punch opening 62 is greater than the width of scrap steel strip 42. Typically, a starter punch opening 62 and 64 will extend in between 1.25" and 1.50" from one of the elongated edges 35 and 37 of raw steel strip 12, although the particular dimensions can vary as needed and desired.

Once starter punch openings 62 and 64 are automatically punched through raw steel strip 12 and are on directly opposite sides, then either sensor control system 82 or the operator can turn on side trimmers 22 and 24 and conveyor system 18. Preferably, conveyor system 18 is turned on slowly to advance raw steel strip 12 to cutting assembly 20 until starter punch openings 62 and 64 reach upper and lower rotary knives 46 and 48 in each side trimmer 22 and 24, as shown in FIG. 4(*c*). When starter punch openings 62 and 64 reach upper and lower rotary knives 46 and 48 in each side trimmer 22 and 24, raw steel strip 12 is released from upper and lower rotary knives 46 and 48 allowing raw steel strip 12 to realigns to its original trimming position, as shown in FIG. 4(*a*). Accordingly, realignment and re-establishment of trimming of raw steel strip 12 in an edge trimming system 10 can be accomplished with minimal effort and with a minimal amount of raw steel strip 12 being wasted.

Having thus described the basic concept of the invention, it will be readily apparent to those skilled in the art that the foregoing detailed disclosure is intended to be presented by way of example only, and is not limiting. Various alterations, improvements, and modifications will occur, and are intended to those skilled in the art, though not expressly stated herein. These modifications, alterations, and improvements are intended to be suggested hereby, and are within the spirit and the scope of the invention. Accordingly, the invention is limited only by the following claims and equivalents thereto.

What is claimed is:

1. A method for re-establishing trimming along both elongated edges of a raw steel strip in an edge trimming system, the edge trimming system including a cutting assembly having a pair of side trimmers each with a cutting device which trims one of the elongated edges of the raw steel strip to produce a parent steel strip and two scrap steel strips, the method comprising the steps of:

stopping the cutting devices from cutting the raw steel strip when only one of the cutting devices is engaged in trimming the raw steel strip;

automatically notching first and second starter punch openings from opposing edges of the raw steel strip to extend in from the opposite edges, the first starter punch opening extending in a first distance from one of the elongated edges and the second starter punch opening extending in a second distance from the other elongated edge of the raw steel strip; and releasing the cutting device still engaged in trimming the raw steel strip by advancing the first and second starter punch openings in the raw steel strip to the cutting devices.

2. The method as set forth in claim 1 wherein the first and second starter punch openings are adjacent to the cutting devices when notched.

3. The method as set forth in claim 1 wherein said step of stopping further comprises:

automatically sensing when only one of the cutting devices is engaged in cutting a raw steel strip and generating a stop signal; and automatically triggering the steps of stopping, notching and releasing when the stop signal is received.

4. The method as set forth in claim 3 wherein the first and second starter punch openings are adjacent to the cutting devices when notched.

5. An apparatus for re-establishing a cut on both sides of a raw steel strip in an edge trimming system, the edge trimming system including a cutting assembly having a pair of side trimmers each with a cutting device, each cutting device trimming one of the elongated edges of the raw steel strip to produce a parent steel strip and two scrap steel strips, the apparatus comprising:

means for stopping the cutting devices from cutting the raw steel strip when only one of the cutting devices is engaged in trimming the raw steel strip;

means for automatically notching first and second starter punch openings from opposing edges of the raw steel strip to extend in from the opposing edges, the first starter punch opening extending in a first distance from one of the elongated edges and the second starter punch opening extending in a second distance from the other elongated edge of the raw steel strip; and means for releasing the cutting device still engaged in trimming the raw steel strip by advancing the first and second starter punch openings in the raw steel strip to the cutting devices.

6. The apparatus as set forth in claim 5 wherein the first and second starter punch openings are adjacent to the cutting devices when notched.

7. The apparatus as set forth in claim 5 further comprising:

means for automatically sensing when only one of the cutting devices is engaged in cutting a raw steel strip and generating a stop signal; and means for automatically triggering the means for stopping, means for automatically notching and means for releasing when the stop signal is received.

8. The apparatus as set forth in claim 7 wherein the first and second starter punch openings are adjacent to the cutting devices when notched.

\* \* \* \* \*